(12) United States Patent
Campo et al.

(10) Patent No.: US 6,517,729 B2
(45) Date of Patent: Feb. 11, 2003

(54) OXIDATION PROCESS OF THE WET OXIDATION OR OZONIZATION TYPE

(75) Inventors: Philippe Campo, Montigny le Bretonneux (FR); Vincent Boisdon, Paris Cedex (FR); Alain Trichet, Viroflay (FR); Patrice Cognart, Bois-le-Roi (FR); Florent Bouquet, Vulaines-sur-Seine (FR)

(73) Assignees: L'Air Liquide - Societe Anonyme a Directoire et Counseil de Surveillance pour l'Etude et l'Exploitation des Procedes Georges Claude, Paris (FR); Robin Industries S.A., Samoreau (FR)

( * ) Notice: Subject to any disclaimer, the term of this patent is extended or adjusted under 35 U.S.C. 154(b) by 0 days.

(21) Appl. No.: 09/784,150

(22) Filed: Feb. 16, 2001

(65) Prior Publication Data

US 2002/0110508 A1 Aug. 15, 2002

(51) Int. Cl.⁷ ................................................. C02F 1/72
(52) U.S. Cl. .................. 210/758; 210/760; 210/912; 162/29; 162/82
(58) Field of Search ........................ 210/758, 760, 210/912; 162/29, 82

(56) References Cited

U.S. PATENT DOCUMENTS

| 4,876,389 A | * | 10/1989 | Gongora et al. |
| 5,380,442 A | * | 1/1995 | Yan |
| 5,824,243 A | * | 10/1998 | Contreras |
| 6,348,129 B1 | * | 2/2002 | Colodette et al. |

* cited by examiner

*Primary Examiner*—Betsey Morrison Hoey
(74) *Attorney, Agent, or Firm*—Burns, Doane, Swecker & Mathis, L.L.P.

(57) ABSTRACT

The present invention relates to a process of oxidation, of the wet oxidation or ozonization type, of a liquid contained in a reactor. The gas of the gas headspace is aspirated into the liquid, and the portion which is not dissolved in the liquid is recovered in the gas headspace. The agitation means creates a flow of liquid immediately adjacent to the end of the duct opening into the liquid, and generates a gas/liquid dispersion in the zone, within which the liquid reacts with the gas, then conveys and ejects the said dispersion at its periphery, such that the gas is dissolved in the liquid in the zone extending from the agitation means to the surface of the liquid. The said process is particularly suitable for oxidations which make use of considerable quantities of oxygen or of ozone. It is particularly applied for the oxidation of papermaking liquors.

58 Claims, 3 Drawing Sheets

OXIDATION PROCESS OF THE WET OXIDATION OR OZONIZATION TYPE

This application claims priority under 35 U.S.C. §§ 119 and/or 365 to (attorney docket No. Serie 5540) filed in France on Dec. 20, 2000; the entire content of which is hereby incorporated by reference.

BACKGROUND OF THE INVENTION

1. Field of the Invention

The present invention relates to a process of oxidation, of the wet oxidation or ozonization type.

The present invention particularly relates to the technology of wet oxidation, which is conventionally implemented in various types of gas/liquid reactors, and particularly bubble columns and tubular reactors, but also agitated reactors, conventional or not.

2. Description of the Related Art

A process of the wet oxidation type is in particular described in an article submitted to the JIE (International Days of Water) of Poitiers in 1998 and entitled: "ATHOS, an innovative solution for the elimination of sludges" (Proceedings JIE Poitiers 23–35 September 1998, Vol. 2, p. 69). Wet oxidation processes generally operate in the following manner: the treatment is carried out with air as oxidant, at 250–270° C. and under 85–120 bars, in reactors having a height/diameter ratio comprised between 5 and 20. There are usually used for these plants, reactors of the bubble column type in which the oxidant gas is injected at the base, co-current or counter-current to the liquid. The height of the column is a function of the yields of gas/liquid transfer. The transfer coefficients are low (generally $10^{-4}$ to $10^{-2}$ s$^{-1}$), making these reactors particularly suitable for reactions having slow kinetics (chemical conditions). The reaction volumes are considerable and the residence times are long (generally several hours).

The above-cited article likewise describes a process known under the name of "Aqueous Phase Oxidation Process", which consists of treating sludges from biological plants with pure oxygen in a tubular reactor placed in a deep borehole of 1,200 m, constituted by two concentric principal tubes, one for injecting the thick sludge and oxygen, and the other for the ascent of the treated sludge.

A conventional stirred reactor (Stirred Tank Reactor or STR) is described in the article by M. Lawrence M. Litz, in CEP, November 1985, pp. 36–39, entitled: "A Novel Gas-Liquid Stirred Tank Reactor". Within such a stirred reactor, the distribution of gases is generally effected by a perforated torus placed at the base of the reactor, below a mechanical agitator designed, in principle, to disperse the gas in the whole of the reaction medium. This type of reactor enables higher transfer coefficients to be obtained, as a function of, among other things, the speed of agitation and the nature of the moving body, leading to lower residence times than those for the above-cited two types of reactors.

A process is described in WO-A-99/04088 of oxidation of white or black liquors, effected under pressure and at high temperature in a stirred reactor equipped with a multi-blade stirrer permitting axial and radial gas/liquid mixing. Downstream of the said reactor there is disposed a gas/liquid separator intended to separate the undissolved gases from the oxidized liquor.

A process is described in WO-A-96/13463 of oxidation of effluents in a non-conventional reactor in the presence of a heterogeneous catalyst which acts in the gas phase formed above the liquid phase. The liquid phase is agitated by recirculation, by means of an external pump. An in-line mixer disposed in the recirculation loop intimately mixes the gas with the liquid phase.

Reactors are described in U.S. Pat. Nos. 4,328,175 and 4,454,077 which are equipped with downflow gas/liquid mixing means constituted by a helicoidal impeller which creates a vortex in the surface of the liquid phase. The gas is injected into the gas headspace of the reactor—the gas headspace being the space formed above the surface of the liquid—and is entrained and mixed with the liquid by a vortex effect within the liquid phase. The pumping output produced by the screw enables the gas/liquid mixture to be dispersed into the whole of the reactor volume.

There is described in U.S. Pat. No. 4,919,849 and EP-A-579 251 an agitated reactor equipped with a helicoidal impeller, in which reactor, above the agitating means of the impeller—axial downflow agitator—oxidant gas injection tubes are provided, which are arranged horizontally below the minimum liquid level and, around a hollow portion of the agitation shaft. The gas, delivered at the end of the said tubes, is taken up by the descending pump output created by the helicoidal impeller (axial flow agitator) placed within the hollow cylinder. The impeller whose rotation ensures the formation of the desired vortex disperses the gas/liquid mixture toward the bottom of the reactor.

Described in EP-A-754 489 is a stirred reactor putting into effect a communication between the gas headspace and the body of the liquid phase. Injected into the gas headspace, the gas is aspirated into the liquid phase by means of L-shaped ducts. These are disposed around the stirrer shaft with their upper ends situated in the gas headspace, while their lower ends open behind, and in the periphery of, the blades of the said stirrer. The stirrer is a radial impeller with flat blades which at the same time ensures aspiration while generating a reduced pressure in the liquid phase and the mixing of the gas into the liquid.

The devices putting into effect a communication between the gas headspace and the body of the liquid phase ensure a recirculation of the gas in the reactor. In this type of apparatus, the recirculated gas flow can be correlated with a dimensionless number known as the "modified Froude number" (Fr*) defined by the following equation:

$$Fr^* = \frac{N^2 \times d^2}{g \times I}$$

with:

N: agitation speed in turns/second, d: diameter of the moving agitator body in m, g: acceleration due to gravity in m/s$^2$, I: depth of immersion of the impeller in m.

The apparatus described in EP-A-0 754 489 enables a value of the "modified Froude number" of 0.64 to be attained.

SUMMARY OF THE INVENTION

The process of the invention is a process of oxidation by an oxidizing gas of compounds dissolved or dispersed in a liquid medium. It concerns a process of oxidation which can equally be implemented in solutions and in dispersions. It is particularly suitable for the oxidation of sludges from biological purification plants, the oxidation of sulfur-containing minerals in hydrometallurgy, and the oxidation of sulfides in papermaking liquors. It also permits, for example, among other applications, improving the biodegradability of dissolved compounds, implemented in a reactor having a gas headspace. It is particularly applicable to wet oxidation or to ozonization.

The present invention comprises a process of oxidation, by means of an oxidizing gas, of a liquid contained in a reactor, which reactor has at least one means for introducing gas into the reactor and at least one means for introducing liquid into the reactor, at least one means for withdrawal of liquid, at least one means for agitating the liquid, at least one duct permitting the aspiration of gas present in the reactor and an opening into the liquid contained in the reactor. In the process, the liquid and the gas are introduced into the reactor in quantities such that a gas headspace is formed above the liquid contained in the reactor, in which, in the step of mixing the gas and liquid, the gas of the gas headspace is aspirated into the duct and introduced into the liquid present in the reactor at the level of the means for agitating the liquid, so as to dissolve at least a portion of the gas in the liquid, and in which, in a recovery step, the portion of the gas which is introduced into the liquid present in the reactor and which is not dissolved in the liquid is recovered in the gas headspace.

DETAILED DESCRIPTION OF THE PREFERRED EMBODIMENTS

The term "gas headspace" is used indifferently to denote the space situated above the liquid phase in the reactor, and the gas contained in this space. The context of the present invention permits one skilled in the art to know without ambiguity the meaning to be attached to this term, where a distinction appears necessary.

The term "oxidizing gas" used in the description means a gas containing an oxidant gas, alone or in a mixture, the oxidant gas being oxygen or ozone. Thus the term oxidizing gas used in the description means a gas containing oxygen or ozone.

The process according to the invention permits, in particular, increasing the performance of oxidation processes with respect to the prior art.

By way of a forced recycling of the oxidizing gas, the process also permits an improvement of the consumption of the oxidant gas contained in the oxidizing gas, thus in particular permitting the use of gases containing considerable quantities of inert gases, while limiting the reaction times and the reaction volumes.

In the case of reactions in liquid media, using gases, it is indeed possible to schematically consider two steps: the first consisting of placing the oxidant in contact with the compound to be oxidized, that is, in the context of concern here, the step of transfer or transport of the gas; the second is the chemical reaction. The overall kinetics of the gas/liquid reaction will thus depend on the slower step. The invention is particularly suited to oxidation reactions in liquid medium by oxygen or ozone, in the case where the second step is very rapid with respect to the first. The determining element for the reaction rate is the transfer of the gas and the placing in contact of the oxidant compounds and the compounds to be oxidized.

The process according to the invention permits a particularly rapid and efficient contacting of a very considerable quantity of compounds to be oxidized with the oxidant compounds by a large-scale supply of the compounds to be oxidized of the liquid toward the gas, in a reactor zone and according to a mode which are judiciously chosen, thus forming a gas/liquid dispersion. This contacting permits the transfer of gas into the liquid and the beginning of oxidation; it is followed by an ejection of the gas/liquid dispersion formed during this first step toward a second reactor zone containing the larger portion of the mass of liquid contained in the reactor, in order to mix there the first dispersion with the whole of the liquid of the reactor, and in order to continue there the transfer and also oxidation which have been commenced. The portion of the oxidizing gas which is undissolved in the liquid phase at the end of these two steps is recovered in the gas headspace. In a third zone, situated below the moving agitator body, and below the oxidizing gas feed (if this takes place in the liquid phase), withdrawal of the treated liquid can be proceeded with, the treated liquid being withdrawn under the agitation means and outside the zone where the ascent of the undissolved gas to the surface takes place; it contains no, or only a little, undissolved gas, generally enabling it to be used without subsequent degasification.

By means of the process of the invention, the transfer rates of oxidant gas are no longer a limiting factor for the reaction rates of rapidly oxidizable compounds. Thus, although without any limitation to this context, it will be seen that the process of the invention is more particularly suited to oxidation reactions which necessitate elevated mass flows of oxidant gas.

According to one of its essential characteristics, the process according to the invention is characterized in that during the step of mixing of the gas and liquid, the liquid agitation means creates a liquid flow in the space immediately adjacent to the end of the duct opening into the liquid and generates a gas/liquid dispersion in the zone neighboring the said space, termed the "pre-reaction zone", within which the liquid reacts with the gas, then conveys and ejects at its periphery the said gas/liquid dispersion along a substantially horizontal direction, such that the gas is dissolved in the liquid in the zone extending from the agitation means to the surface of the liquid, termed "mixing zone".

The process according to the invention thus ensures a high flow of oxidizing gas transferred to the liquid contained in the reactor. The process of the invention thus ensures a very rapid consumption of the oxidant gas; this is by virtue of its mode of recirculation from the gas headspace toward the liquid, but also, above all, by virtue of its mode of conjoint circulation of liquid toward the input point of the aspirated gas, such that a first zone, advantageously fed with oxidizing gas coming from the gas headspace and with a liquid flow, is created at the base of the gas input duct. The compounds, oxidant and compound to be oxidized, will meet in this first zone and immediately react, this is why this zone is termed the pre-reaction zone. The portion of the oxidizing gas which has not reacted forms with the liquid a dispersion which is conveyed by the agitation means toward the periphery of the latter, to be ejected into the mass of liquid contained in the reactor, substantially parallel to the surface, to complete there its dispersion and its transfer within the liquid.

The mode of ejection of the gas/liquid dispersion (parallel to the surface) enables the height to be limited between the place of ejection into the mass of liquid and the point of withdrawal of the liquid, the transfer of gas indeed taking place vertically, and in the absence of an axial mixing member, in a zone delimited in the lower portion of the liquid phase by the reactor walls, and in its upper portion by the surface of the liquid. The contacting of the oxidant gas and the compounds to be oxidized, and consequently the oxidation, proceeds in this second zone, termed the "mixing zone". The portion of the oxidizing gas which is undissolved at the end of its ascent toward the surface is recovered in the headspace.

The process according to the invention, by virtue of its contacting and circulation of the gas in the liquid, thus ensures an elevated mass flow of oxidant gas per unit volume of liquid contained in the reactor, and per unit time.

Indeed, if the mass flow of oxidant gas is considered, taking place per unit volume of the liquid and per unit time, the process of the invention permits a transfer of oxidant gas per $m^3$ of reaction volume, per hour and per bar of partial pressure of oxidant gas, such that, with:

F=mass of oxidant gas/$m^3$ of liquid reaction volume/h,
then $F \geq 0.1$ kg/$m^3$/h and can reach 750 kg/$m^3$l/h, if the oxidant gas is oxygen (kg of pure oxygen), with a partial pressure of oxygen comprised between 1 and 10 bar;
then $F \geq 0.2$ kg/$m^3$/h and can exceed 40 kg/$m^3$/h, if the oxidant gas is ozone (kg of pure ozone), with a partial pressure of ozone comprised between 0.05 and 0.5 bar.

As a function of the applications envisaged, the gas flows put to use could particularly be (without this constituting a limitation of the process of the invention):

In the case of oxidation of sulfur compounds with oxygen:
0.1 kg $O_2$/$m^3$/h$\leq F \leq$750 kg $O_2$/$m^3$/h;
In the case of oxidation with oxygen of biological plant sludges:
1 kg $O_2$/$m^3$/h$\leq F \leq$200 kg $O_2$/$m^3$/h;
In the case of oxidation with oxygen of effluents which are little biodegradable:
2 kg $O_2$/$m^3$/h$\leq F \leq$100 kg $O_2$/$m^3$/h;
In the case of oxidation by ozone:
0.01 kg $O_3$/$m^3$/h$\leq F \leq$40 kg $O_3$/$m^3$/h; more generally, 0.2 kg $O_3$/$m^3$/h$\leq F \leq$40 kg $O_3$/$m^3$/h.

This type of oxidation makes use of masses of oxidant gas per unit volume of liquid which can be very considerable. To carry it out, a person skilled in the art traditionally has recourse to reactors such as bubble columns with elevated residence times in order to permit a considerable gas transfer per unit volume of liquid. He can also have recourse to systems of recirculation by external loop according to the prior art.

The process of the invention permits high mass flows of oxidant gas per unit volume of liquid treated to be obtained within the reactor, by the improvement of transfer particularly by means of the pre-reaction zone formed and by the internal recirculation of the oxidizing gas according to the invention.

The flow rate of recirculated gas is at least equal to the flow rate of gas introduced and advantageously at least equal to three or four times this flow rate.

The recirculation flow rate is optimized, improved, with respect to the prior art technologies.

According to a particular embodiment of the invention, the liquid is continuously introduced and withdrawn.

According to another particular embodiment of the invention, the liquid is introduced and withdrawn discontinuously.

According to a particularly advantageous embodiment of the invention, at least one means for introduction of liquid into the reactor introduces the liquid adjacent to the agitation means in a manner such that at least a portion of the flow of liquid into the space comes directly from the said means for introduction of liquid into the reactor. The oxidation reaction in the pre-reaction zone will indeed be the more effective, the more the liquid brought to the inlet of the aspirated gas will contain elements to be oxidized. A privileged localization is thus concerned, for the introduction into the reactor of liquid which is rich in compounds to be oxidized.

Advantageously, the liquid is withdrawn in a third zone of the reactor termed the "withdrawal zone", situated in the lower portion of the reactor, and the withdrawn liquid has a content of undissolved gas less than 5% by volume of gas/volume of liquid. The liquid thus withdrawn below the agitation means, and below the oxidizing gas feed when this takes place into the liquid, will in general not have any need for subsequent degasification. Thus it will not be necessary to add a degasifying reactor downstream. It will be possible to optimize the reactor used for carrying out the process of the invention from the standpoint of the space occupied by it.

Thus the recirculation of the oxidizing gas and its dispersion in the liquid, associated with a sufficient agitation of the latter (without having to deal with the maintenance of a vortex there), creates a perfect mixing of gas and liquid in the whole of the reactor, while permitting a withdrawal of treated liquid, poor in gas, at the low portion of the reactor, in the withdrawal zone. The excellent gas/liquid mixing within the reactor can be appreciated by the level of gas retention obtained within the reactor, which level can reach 50% or more.

According to a particular embodiment of the invention, the oxidizing gas contains at least 20% oxygen, preferably at least 80% oxygen, and more preferably more than 98% of oxygen.

According to a particular embodiment of the invention, the oxidizing gas contains ozone.

The reactor preferably delimits a closed volume. Indeed, the process of the invention, although it can be carried out—in the case of a reaction carried out at a pressure close to atmospheric pressure—in a reactor whose headspace is a space which is protected but not closed, formed above a liquid phase, it is more advantageously carried out in a reactor delimiting a closed volume.

The liquid is preferably an aqueous liquid.

The oxidizing gas is advantageously continuously supplied from an external source.

According to a particular embodiment of the invention, the feed of oxidizing gas takes place at a controlled flow rate of introduced gas.

The feed of oxidizing gas advantageously takes place at a controlled pressure of oxidizing gas in the gas headspace.

In a preferred manner, during its feed into the reactor, the oxidizing gas is introduced into the liquid and/or the gas:
 directly, into the gas headspace; and/or,
 directly within the liquid contained in the reactor, advantageously by means of a torus perforated with suitable orifices; and/or,
 into a space formed in the gas headspace, totally or partially isolated from the said headspace, such that it is directly aspirated to be dispersed in the liquid.

It will generally be delivered into the liquid contained in the reactor by means of a torus, or into the gas headspace.

Advantageously, during the performance of the process, a purge of the gas headspace is carried out at a point situated at a sufficient distance from the place where oxidizing gas is introduced so that it does not perturb the operation of the reactor. Indeed, when non-oxidizing gases are present in the gas headspace, their accumulation is detrimental to the course of the oxidation reaction, and can even lead to stopping it; it is thus necessary to purge the gas headspace to reduce the concentration of these gases. In order to avoid directly intercepting the oxidizing gas before it has circulated in the reactor, the purge is effected at a point sufficiently distant from the place of introduction of the oxidizing gas.

According to a particularly advantageous embodiment of the invention, the agitation means comprise an auto-aspirating impeller connected by a shaft to a drive system. This agitation means ensures the implementation of the process of the invention; the implementation comprises:

the agitation of the liquid phase, the aspiration of gas in the gas headspace and its input into the agitated liquid at the level of the agitation means, the formation of the gas/liquid dispersion in the pre-reaction zone, its ejection at the periphery of the agitation means into the mixing zone, and the recycling of the gas into the gas headspace.

Preferably, an auto-aspirating impeller having a high modified Froude number (the definition of the modified Froude number (Fr*) having been recited in the introduction of the present text) is used; thus, the auto-aspirating impeller preferably has a modified Froude number of at least 1, advantageously comprised between 1.5 and 4. In trials, an auto-aspirating impeller having a modified Froude number of about 1.5 made it possible to obtain a flow rate of recirculation of the gas between the gas headspace and the liquid equal to four times the flow rate of gas introduced into the reactor. The Applicant has obtained, under such conditions, transfer coefficients of between 1 and 10 s$^{-1}$, or about 1,000 times greater than those of bubble columns, 10 times greater than those of conventional stirred reactors of the STR type, or than those of agitated reactors equipped with a recirculation loop.

The auto-aspirating impeller (impeller-pump) advantageously utilized in the implementation of the process of the invention can be of various types; at all events, the impeller is a type generating a radial flow, substantially parallel to the surface of the liquid.

According to a first variant, the impeller shaft is a hollow shaft having at least one aperture at the level of the gas headspace, the gas being aspirated at the level of the aperture into the hollow shaft.

According to a second variant, the impeller shaft is a solid shaft coaxially enveloped by an advantageously cylindrical jacket, a space being formed between the solid shaft and the jacket, which communicates at its upper end with the gas headspace and opens at its lower end at the level of the pre-reaction zone into the auto-aspirating impeller, the gas being aspirated at the level of the gas headspace into the space formed between the shaft and the jacket.

It is likewise possible to arrange ducts, for gas transfer from the gas headspace to the impeller, around the solid or hollow, preferably solid, shaft.

Whatever the type of shaft which is employed, it can be associated with auto-aspirating impellers of different types.

Advantageously, the auto-aspirating impeller comprises at least two horizontal disks, an upper disk and a lower disk, connected together by ribs (or radial vanes); a space is formed between the upper disk and the impeller shaft and ensures the input of the flow of liquid immediately adjacent to the end of the (gas aspiration) duct toward the pre-reaction zone situated at the base of the shaft between the turbine disks. The utilization of such a disk impeller ensures an excellent radial dispersion of the gas in the liquid in the "mixing zone".

Whatever the precise geometry of the impeller, and the arrangement permitting its shaft to transfer gas from the gas headspace toward the impeller, it is advantageously provided to deliver the said gas into a zone of maximum turbulence (advantageously generated by the space provided in the upper disk of the disk impeller).

With the aim of preventing any settling of solid material in the bottom of the reactor, in an advantageous manner, the solid materials present are placed in suspension.

Advantageously, the reactor within which the process of the invention is implemented is equipped with anti-vortex counter-vanes on its internal walls. These are intended to prevent the appearance of a vortex which could be prejudicial to good gas/liquid mixing.

The oxidation process of the invention generally puts exothermic reactions into effect. On this assumption, an at least partial removal of the liberated calories is advantageously effected using cooling means disposed within and/or outside the reactor. Such cooling means, as well as their various modes of layout, are known to one skilled in the art. They act in a conventional manner; generally, a heat exchange fluid circulates within them.

The oxidation process of the invention can furthermore require, in order to start it, a heating of the charge (liquid loaded with compounds to be oxidized). Independently of the starting step, it can be found to be necessary to provide calories to the treated charge, particularly on the supposition that the oxidation process being performed does not enable autothermic conditions to be attained. In this case, the liquid is advantageously heated. Conventional means are applied for this purpose.

In particular, the oxidation implemented according to the process of the invention can be a catalytic oxidation. Under this supposition, the catalyst can act in the gas headspace (generally, a heterogeneous catalysis) and/or in the liquid (heterogeneous and/or homogeneous catalysis), and/or in or around the shaft, according to whether a hollow or a solid shaft is concerned, within the scope of the utilization of an auto-aspirating impeller (generally, heterogeneous catalysis), and/or in the impeller.

The process of the invention is advantageously implemented with:

control of the temperature ($\theta$) and of the pressure (P) within the reactor, and/or, control of the liquid level within the said reactor, and/or, control of the quantity of oxidant gas introduced, and/or, control of the concentration of oxidant gas in the gas headspace, when at least one non-oxidant gas is contained in the oxidizing gas.

The process of the invention, performing per se, by the fact that its implementation optimizes the utilization of the oxidizing gas, has been found to be remarkably suitable in numerous contexts, and particularly when it is implemented:

(a) for the oxidation with oxygen of liquid constituted by aqueous media containing sulfur compounds and/or metallic compounds, and in particular for:

the partial or complete oxidation of sulfides of papermaking liquors, the synthesis of polysulfides by oxidation of papermaking liquors, the oxidation of sulfides in industrial effluents, the oxidation of sulfites to sulfates, the oxidation of thiosulfates to sulfates, the oxidation of metallic compounds such as $FeSO_4$, FeS, $FeCl_2$;

(b) for the oxidation with oxygen of liquid constituted by aqueous media containing organic compounds and having a chemical oxygen demand (COD) comprised between 5 and 200 g/l, and particularly for the oxidation of difficultly biodegradable effluents and/or effluents containing inhibitors of biological reactions;

(c) for the oxidation with oxygen of organic sludges in aqueous media;

(d) for the oxidation with ozone of aqueous media, and particularly for:

the decolorization with ozone of industrial effluents or of process waters;

the ozonization of biological sludges, the ozonization of cyanides, the ozonization of aqueous solutions containing organic compounds and having a chemical oxygen demand (COD) comprised between 10 mg/l and 10 g/l.

In each of the contexts (a) to (d) given hereinabove, the Applicant recommends the implementation of the oxidation according to the invention under the following conditions of temperature ($\theta$) and of pressure in the gas headspace (P):

(a)

20° C.$\leq\theta\leq$200° C. and $10^5$ Pa$\leq$P$\leq 10^7$ Pa (between 1 and 100 bars); advantageously, 60° C.$\leq\theta\leq$150° C. and $10^5$ Pa$\leq$P$\leq 30.10^5$ Pa (between 1 and 30 bars); preferably, 100° C.$\leq\theta\leq$130° C. and $10^5$ Pa$\leq$P$\leq 15.10^5$ Pa (between 1 and 15 bars);

(b)

20° C.$\leq\theta\leq$250° C. and $10^5$ Pa$\leq$P$\leq 10^7$ Pa (between 1 and 100 bars); advantageously, 80° C.$\leq\theta\leq$180° C. and $10^5$ Pa$\leq$P$\leq 25.10^5$ Pa (between 1 and 25 bars);

(c)

40° C.$\leq\theta\leq$300° C. and $10^6$ Pa$\leq$P$\leq 15.10^6$ Pa (between 10 and 150 bars); advantageously, 150° C.$\leq\theta\leq$250° C. and $2.10^6$ Pa$\leq$P$\leq 12.10^6$ Pa (between 20 and 120 bars);

(d)

5° C.$\leq\theta\leq$90° C. and $10^5$ Pa$\leq$P$\leq 1.510^6$ Pa (between 1 and 15 bars); advantageously, 10° C.$\leq\theta\leq$30° C. and $10^5$ Pa=P=$3.10^5$ Pa (between 1 and 3 bars).

In one or other of the abovementioned contexts (a) to (d), the oxidation is preferably implemented in the presence of at least one initiator for radical reactions, particularly chosen from among hydrogen peroxide, ultraviolet rays, catalysts of the metal or metal compound type, OH ions, and quinones.

The operation of the process of the invention permits minimizing the residence time of the liquid in the reactor, under mild conditions of temperature and pressure (see in particular the advantageous and preferred ranges given hereinabove). The results obtained when carrying out the oxidation of sulfides or the oxidation of effluents in order to improve their biodegradability, according to the invention, are particularly remarkable.

Figure 1:
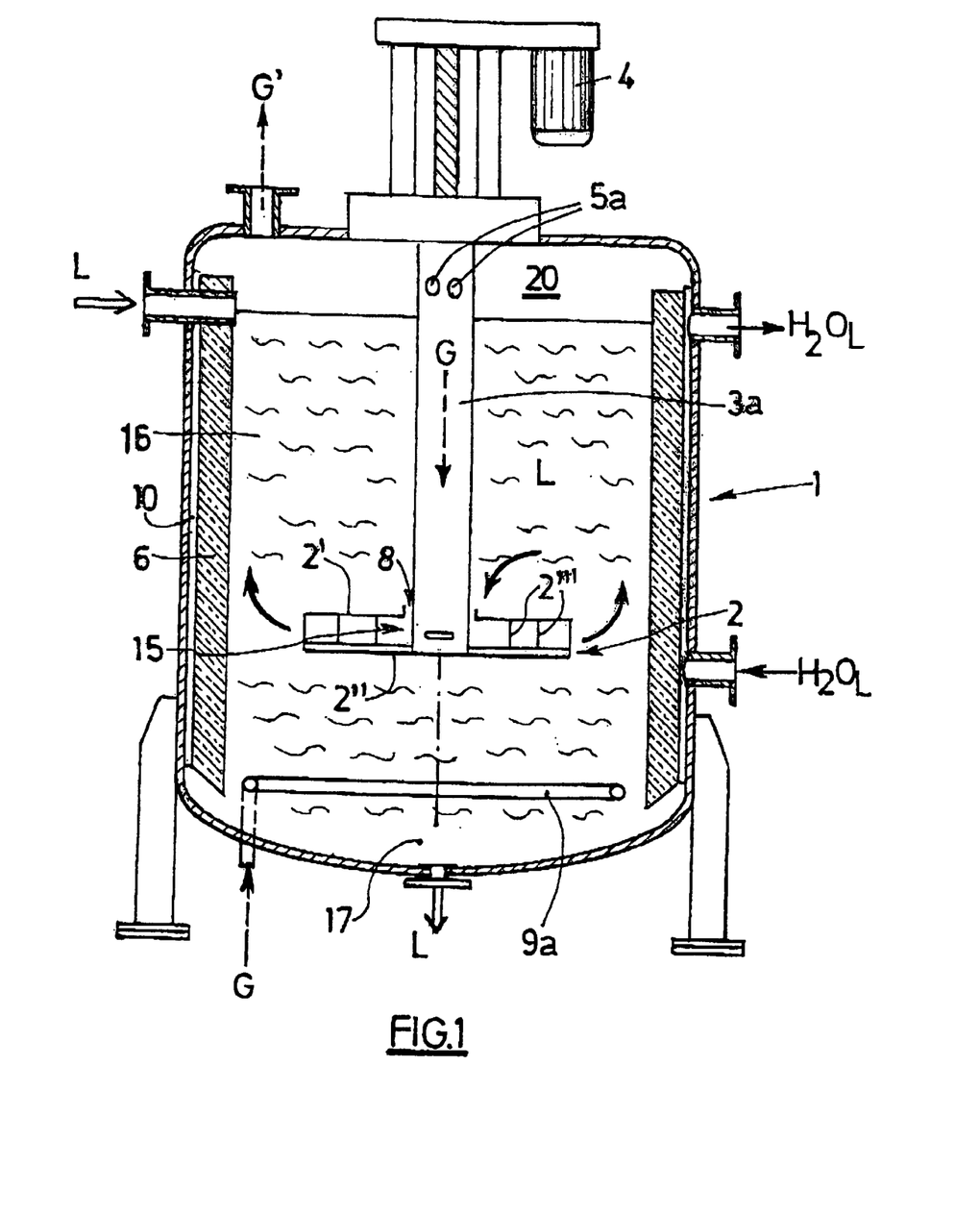
FIGS. 1–3 show schematically, in section, a reactor equipped with means for the implementation of three variants of the process of oxidation according to the invention.
Figure 2:
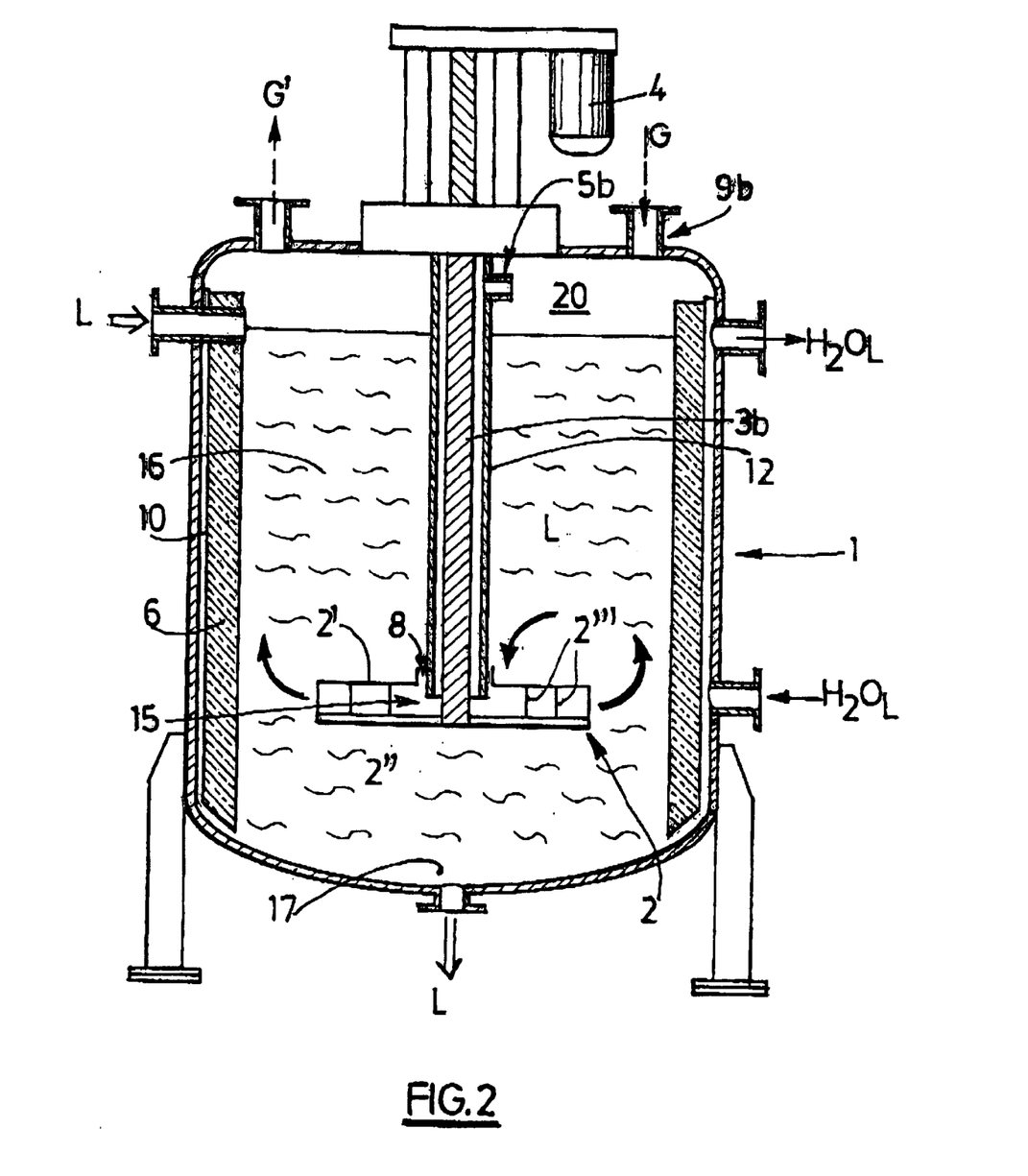
Figure 3:
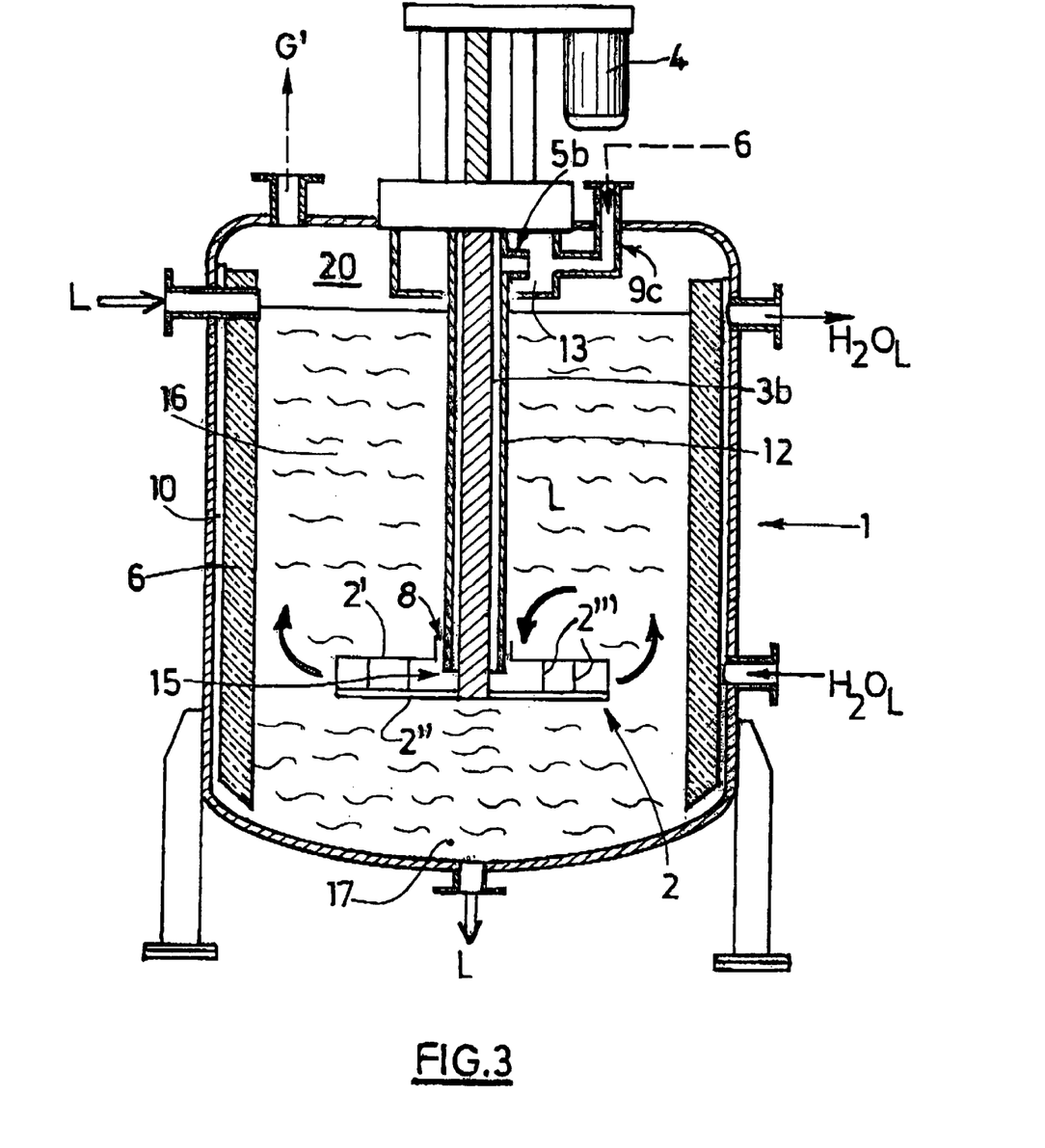

It is now proposed to recite the principal characteristics of the process of the invention, with reference to the three accompanying drawings.

In the three Figures,

L denotes the liquid to be treated, contained in the reactor; the liquid is introduced in an upper portion of the reactor and withdrawn at a lower point, continuously or discontinuously;

G denotes the oxidizing gas (containing non-oxidant gas G' which, not consumed, is purged from the gas headspace 20);

1 denotes the closed reactor equipped with an auto-aspirating impeller 2.

The auto-aspirating impeller 2 is a disk impeller. It has an upper disk 2' and a lower disk 2", made integral by means of ribs or radial vanes 2'''. In the upper disk 2' there is formed a central space 8 into which the gas input device (hollow shaft 3a or solid shaft 3b) penetrates. Liquid is aspirated into the impeller via the space 8 to form a gas/liquid mixture. The impeller 2 is driven in rotation by means of the shaft (3a, 3b), due to the drive system (motor) 4.

The reactor 1 is likewise equipped:

with anti-vortex counter-vanes 6, on its inner walls;

with a cooling circuit 10, in the said inner walls, within which circuit there circulates water as cooling fluid.

According to the variant of the process shown in FIG. 1, the oxidizing gas G (VSA oxygen, for example) is introduced into the liquid in the lower part of the reactor 1 through a torus 9a, which is perforated with suitable orifices. After a first pass through the agitated liquid, the gas G is in part again located in the gas headspace 20. It is then aspirated through apertures 5a into the hollow shaft 3a. The hollow shaft 3a, having at least one slot (not referenced) in its lower portion at the level of, and within, the auto-aspirating impeller, delivers the aspirated gas within the liquid via a first step of mixing the gas with the liquid L present within the impeller, this first step of mixing taking place in the pre-reaction zone 15 situated in the impeller, around the shaft. During this first mixing, a portion of the compounds reacts, and at the same time a first gas/liquid dispersion is formed. This step is followed by a radial ejection of the dispersion into L. The quality of the gas/liquid mixture within the reactor can be expressed as a retention of gas greater than 50%. This mixing takes place in the mixing zone 16 in the reactor. The gas is, in part, recirculated several times. To avoid an accumulation of non-oxidizing gas in the gas headspace 20, a purge device G' has been provided on the upper wall of the reactor 1. The treated liquid is discharged by withdrawal at the lower part of the reactor. This withdrawal is in particular effected in the withdrawal zone 17 formed below the impeller and below the feed torus for gas G.

According to the variant of the process shown in FIG. 2, the oxidizing gas G is introduced into the gas headspace 20, in the upper portion of the reactor 1, through an injection device 9b. It is then directly aspirated into the space formed around the solid shaft 3b, the space being formed between the solid shaft 3b and a cylindrical jacket 12 formed around the shaft 3b at the level of the orifice 5b passing through the jacket 12, to be delivered at the level of, and within, the auto-aspirating impeller 2. The jacket 12 has a suitable height (the variant shown) or suitable orifices for the delivery of gas in the immediate neighborhood of the liquid inlet space 8. The gas is thus perfectly mixed with the liquid, and recirculates, according to a variant of the previously described mode.

According to the variant shown in FIG. 3, the oxidizing gas G (ozone, for example) is introduced into the gas headspace 20, in a space 13. It is introduced by the skewness of means 9c in the said space 13, where it is aspirated into the space formed between the solid shaft 3b and the jacket 12 (aspiration through the orifice 5b formed in the jacket 12) to be delivered at the level of, and into, the auto-aspirating impeller 2, in conformity with the preceding variants. Such a mode of introduction of the gas G, which could be described as "protected introduction", limits the direct bleed of the gas G by the purge system.

According to the variant shown, the space 13 formed within the gas headspace 20 is only partially isolated from the gas headspace 20; this makes possible the recycling of the gas through the orifices 5b within this space 13.

Another variant can very well be conceived in which the protected space for the introduction of the gas G is completely isolated from the gas headspace. As part of such a variant, the introduced gas G is aspirated through orifices 5b, and it is necessary to provide in the jacket, at the level of the gas headspace but outside the protected space, at least one other orifice for the aspiration of the gas present in the gas headspace after having circulated in the liquid L.

The invention will now be illustrated by the examples hereinafter.

EXAMPLE 1

In a first series of trials, the Applicant oxidized (with oxygen), according to the invention, white papermaking liquors having the following characteristics:

concentration of sulfide 18 g/l (44 g/l of $Na_2S$)

initial temperature 85° C.

approximate caustic soda content: 90 g/l (NaOH).

The liquors, after oxidation, are used as a source of alkali in the papermaking process.

The unoxidized liquor is continuously introduced into the upper portion of a reactor equipped with an auto-aspirating impeller. The discharge of oxidized liquor is regulated by a level sensor. The withdrawal is carried out in the lower part of the reactor. The oxidation is effected at constant pressure by an input of oxidizing gas according as oxygen is consumed.

The increase of temperature is due only to the calories liberated by the reaction. The reaction temperature is regulated by the use of an external cooling coil.

In the case of the utilization of an oxidizing gas containing inert gases (case of Trial 2), a purge proportional to the flow rate of entering gas is carried out. This purge is effected from the gas contained in the headspace of the reactor. It permits principally eliminating the introduced inert gases, while maintaining an oxygen consumption very close to stoichiometric. The reactor used is of the type of that shown in FIG. 1.

The reactor used and the auto-aspirating impeller with which it is equipped are of stainless steel 316L. The reactor and the impeller have the following characteristics:

Internal diameter of the tank: 0.8 m

Useful volume of the reactor: 300 to 450 l

Height of assembly (motor+tank): 2.7 m

Maximum service pressure: 20 bars

Power of agitation motor: 3 to 15 kW

Variable shaft rotation speed: between 500 and 1,200 rpm

Diameter of the impeller: 27 cm

Depth of immersion of the impeller: 70 cm

The trials were carried out under the conditions shown in Table 1 hereinafter. The results obtained are shown in Table 2 hereinafter.

TABLE 2

| Trial | Residual Sulfide | Percentage of Thiosulfate Formed* | Percentage of Sulfate Formed* | Theoretical Requirement (oxygen in mol/mol sulfide) | Oxygen Consumed (oxygen in mol/mol sulfide) |
|---|---|---|---|---|---|
| 1 | 0 | 67% | 33% | 1.23 | 1.36 |
| 2 | 0 | 6% | 94% | 1.9 | 2.12 |
| 3 | 0 | 5% | 95% | 1.92 | 2.13 |

*The percentages of thiosulfate and sulfate are given by weight. The calculation is effected solely on the ions $SO_4^{-2}$ and $S_2O_3^{-2}$.

It can be seen that it is possible to obtain high rates of conversion into sulfate with relatively low temperatures and pressures (see Trial 2). These low temperatures enable the risks of corrosion of the plant to be greatly limited, and the low pressures avoid recompressing the gas for application.

The residence times of the liquor L in the reactor are particularly low for the chosen temperatures. This permits very compact installations to be obtained (time≦13 min with impure gas).

For all the trials, the oxygen consumptions remain close to stoichiometric.

EXAMPLE 2

The Applicant carried out wet oxidation, according to the process of the invention, of waste caustic soda of refineries, having the following characteristics:

Chemical oxygen demand (COD): 25,000 mg/l

Total organic carbon (TOC): 300 mg/l

Initial temperature of the effluent: 18° C.

The effluent after oxidation is neutralized before its disposal.

As in Example 1, the effluent is continuously introduced into the upper portion of a reactor equipped with an auto-aspirating impeller 2; its discharge after oxidation is regulated by a level sensor. The withdrawal is effected in the lower portion of the reactor.

A pressure regulator enables pressure to be maintained by an input of oxygen according to its consumption.

The reactor used is identical to that of Example 1.

The parameters of the process of oxidation (by oxygen) which was carried out are shown in Table 3 hereinafter.

TABLE 3

| Trial | Liquid Flow Rate (l/min) | Gas Flow Rate (Nl/min) | Purity of Gas (mol % of $O_2$) | $O_2$ Molar Flow Rate (kmol/h/m³ of Useful Volume) | Temperature (° C.) | Relative Pressure (bars) | Residence Time (min) |
|---|---|---|---|---|---|---|---|
| 1 | 33 | 580 | 99.9% | 3.6 | 130 | 8 | 13 |

Under these mild conditions of oxidation, a reduction of 98% in the chemical oxygen demand (COD, essentially due to the presence of sulfides) was obtained.

TABLE 1

| Trial | Liquid Flow Rate (l/min) | Gas Flow Rate (Nl/min) | Gas Purity (mol % $O_2$) | Purge Flow Rate (Nl/min) | Q Gas recirculated/ Q gas injected | Molar Flow $O_2$ (kmol/h/m³ of Useful Volume) | Temperature (° C.) | Relative Pressure (bars) | Residence Time (min) |
|---|---|---|---|---|---|---|---|---|---|
| 1 | 100 | 1810 | 99.9% | | 2.6 | 16.1 | 105 | 7.8 | 3 |
| 2 | 33 | 970 | 93% | 150 | 4.9 | 5.6 | 125 | 8 | 13 |
| 3 | 75 | 1980 | 99.9% | | 5.5 | 17.6 | 160 | 19 | 4 |

EXAMPLE 3

The Applicant performed a wet oxidation (with oxygen, 99.9% molar purity), according to the process of the invention, of a chemical industry effluent. The effluent considered is composed essentially of nitrogen-containing organic compounds, which are very difficultly biodegradable. It has the following principal characteristics:

Chemical oxygen demand (COD): 14,700 mg/ml

Ratio COD/$BOD_5$: 11.6 ($BOD_5$: biological oxygen demand within 5 days)

Organic nitrogen: 1,000 mg/l

Initial temperature of the effluent: 150° C.

The reactor used for this trial is also of the type shown in FIG. 1. It is of stainless steel, equipped with an auto-aspirating impeller of Hastelloy C22. The reactor and the impeller have the following characteristics:

Internal diameter of the tank: 12 cm

Useful volume: 2 liters

Height of assembly (motor+tank): 80 cm

Maximum service pressure: 30 bars

Power of agitation motor: 0.18 kW

Variable shaft rotation speed: between 500 and 3,000 rpm

Cooling ensured by an internal coil

Preheating ensured by a double wall

Diameter of the impeller: 4 cm

Depth of immersion of the impeller: 10 cm.

The reaction temperature is 165° C.

The absolute pressure of the reactor is 20 bars.

After 45 minutes of residence time of the said effluent in the reactor, there are observed:

a reduction of the chemical oxygen demand (COD) of 11%;

a total ammonification, representing a total degradation of the nitrogen-containing organic compounds;

a COD/$BOD_5$ ratio=4.6 (this reduction of the value of the ratio from 11.6 to 4.6 represents a considerable increase in the biodegradability of the effluent).

A similar result could no doubt be obtained, with much shorter residence times, under conditions of higher temperature and pressure.

The oxidizing treatment, always carried out under mild conditions of pressure and temperature, permits disposal to a suitable biological treatment plant which will eliminate the remainder of the organic and nitrogenous pollution.

The utilization, within the scope of the invention, of mild conditions of oxidation permits limiting the constraints on materials for the plant (thickness of steel used, corrosion, risks of leaks, . . . ) while leading to the anticipated results.

EXAMPLE 4

The Applicant evaluated the performance of the process of the invention in the context of decolorization with ozone. Decolorization tests were carried out on a laboratory scale on the same colored effluent containing 100 ppm of soluble COD:

(a) in an agitated reactor equipped with an auto-aspirating impeller (reactor identical to that of Example 3);

(b) in a reactor of the bubble column type.

In each of the two cases, a reduction of the color by 66%, measured according to the Pt/Co index, for a wavelength of 455 nm, was obtained. The conditions of the tests are given in the following Table 4.

TABLE 4

|  | Bubble Column Reactor (Prior Art) | Agitated Reactor with Auto-Aspirating Impeller (Invention) |
| --- | --- | --- |
| Dose of ozone (mg/l) | 62 | 35 |
| Residence time (min) | 30 | 10 |
| Mass flow of ozone (kg $O_3$/h/$m^3$ of reaction volume) | 0.12 | 0.22 |
| Reduction of the COD (ppm) | 15 | 0 |

These results show that the selectivity of the action of ozone is greater when the technology of the invention is implemented.

Indeed, in this example, the kinetics of the ozonization of the colorants are much more rapid than the kinetics of oxidation of the COD. Thus, in the case of utilization of a bubble column, within which the supply of oxidant is much less rapid than the kinetics of oxidation of the colorants, a portion of the oxidant (ozone) is consumed for reduction of the COD. When the process of the invention is implemented, the supply of oxidant is no longer limiting with respect to the kinetics of decolorization, and an excellent homogeneity of the medium is obtained; it is possible under these conditions, by controlling the residence time, to implement the rapid decolorization reactions, while the reduction of the COD remains below the limit of detection.

Thus a gain of the order of 40% for the consumption of ozone, and of a factor of 3 for the volume of the reactor, was obtained by the application of the process of the invention to the decolorization.

What is claimed is:

1. A process of oxidation of a liquid contained in a reactor by means of an oxidizing gas with the reactor, comprising:

at least one means of introduction of gas into the reactor and at least one means of introduction of liquid into the reactor, at least one means of withdrawal of liquid, at least one means of agitation of liquid, at least one duct permitting the aspiration of gas present in the reactor and opening into the liquid contained in the reactor, and with the process being comprised of the liquid and the gas being introduced into the reactor in quantities such that a gas headspace is formed above the liquid contained in the reactor, mixing the gas and liquid with the gas of the gas headspace being aspirated into the duct and introduced into the liquid present in the reactor at the level of the means of agitation of the liquid so as to dissolve at least a portion of the gas in the liquid, and recovering the portion of the gas which is introduced into the liquid present in the reactor and which is not dissolved in the liquid in the gas headspace, wherein during the step of mixing the gas and liquid, the means of agitation of the liquid creates a flow of liquid in the space immediately adjacent to the end of the duct opening into the liquid and generates a gas/liquid dispersion in the zone in the neighborhood of the said space, termed pre-reaction zone, within which the liquid reacts with the gas, and then conveys and ejects at its periphery the said gas/liquid dispersion in a substantially horizontal direction, such that the gas is dissolved in the liquid in the zone extending from the agitation means to the surface of the liquid, termed mixing zone.

2. The process according to claim 1, wherein the liquid is continuously introduced and withdrawn.

3. The process according to claim 2, wherein at least one means of introduction of liquid into the reactor introduces the liquid adjacent to the agitation means in a manner such that at least a portion of the flow of liquid into the space comes directly from the said means of introduction of liquid into the reactor.

4. The process according to claim 2, wherein the liquid is withdrawn in a third zone of the reactor termed withdrawal zone, situated in the lower portion of the reactor and wherein this withdrawn liquid has a content of undissolved gas less than 5% by volume of gas/volume of liquid.

5. The process according to claim 2, wherein the oxidizing gas contains at least 20% oxygen.

6. The process according to claim 2, wherein the oxidizing gas contains ozone.

7. The process according to claim 2, wherein the feed of oxidizing gas takes place at a controlled pressure of oxidant gas in the gas headspace.

8. The process according to claim 2, wherein, during the implementation of the process, a purge of the gas headspace is effected at a point situated at a sufficient distance from the place of introduction of the oxidizing gas so as not to disturb the operation of the reactor.

9. The process according to claim 2, wherein the agitation means comprise an auto-aspirating impeller connected by a shaft to a drive system.

10. The process according to claim 1, wherein the liquid is discontinuously introduced and withdrawn.

11. The process according to claim 1, wherein at least one means of introduction of liquid into the reactor introduces the liquid adjacent to the agitation means in a manner such that at least a portion of the flow of liquid into the space immediately adjacent to the end of the duct opening comes directly from the said means of introduction of liquid into the reactor.

12. The process according to claim 11, wherein the liquid is withdrawn in a third zone of the reactor termed withdrawal zone, situated in the lower portion of the reactor and wherein this withdrawn liquid has a content of undissolved gas less than 5% by volume of gas/volume of liquid.

13. The process according to claim 11, wherein the oxidizing gas contains at least 20% oxygen.

14. The process according to claim 11, wherein the oxidizing gas contains ozone.

15. The process according to claim 11, wherein the feed of oxidizing gas takes place at a controlled pressure of oxidant gas in the gas headspace.

16. The process according to claim 11, wherein, during the implementation of the process, a purge of the gas headspace is effected at a point situated at a sufficient distance from the place of introduction of the oxidizing gas so as not to disturb the operation of the reactor.

17. The process according to claim 11, wherein the agitation means comprise an auto-aspirating impeller connected by a shaft to a drive system.

18. The process according to claim 1, wherein the liquid is withdrawn in a third zone of the reactor termed withdrawal zone, situated in the lower portion of the reactor and wherein this withdrawn liquid has a content of undissolved gas less than 5% by volume of gas/volume of liquid.

19. The process according to claim 1, wherein the oxidizing gas contains at least 20% oxygen.

20. The process according to claim 1, wherein the oxidizing gas contains ozone.

21. The process according to claim 1, wherein the reactor delimits a closed volume.

22. The process according to claim 1, wherein the liquid is an aqueous liquid.

23. The process according to claim 1, wherein the oxidizing gas is continuously fed from an external source.

24. The process according to claim 23, wherein the feed of oxidizing gas takes place with a controlled flow rate of introduced gas.

25. The process according to claim 1, wherein the feed of oxidizing gas takes place at a controlled pressure of oxidant gas in the gas headspace.

26. The process according to claim 1, wherein the oxidizing gas, during its introduction into the reactor, is introduced into the liquid and/or the gas:

directly, into the gas headspace; and/or, directly into the liquid contained within the reactor, into a space formed in the gas headspace, totally or partially isolated from the said headspace, such that it is directly aspirated to be dispersed into the liquid.

27. The process according to claim 26, wherein the liquid and/or gas is introduced into the reactor directly into the liquid contained within the reactor by means of a torus perforated with suitable orifices.

28. The process according to claim 1, wherein, during the implementation of the process, a purge of the gas headspace is effected at a point situated at a sufficient distance from the place of introduction of the oxidizing gas so as not to disturb the operation of the reactor.

29. The process according to claim 1, wherein the agitation means comprise an auto-aspirating impeller connected by a shaft to a drive system.

30. The process according to claim 29, wherein said auto-aspirating impeller has a modified Froude number between 1.5 and 4.

31. The process according to claim 29, wherein the said auto-aspirating impeller has a modified Froude number of at least 1.

32. The process according to claim 31, wherein the shaft is a hollow shaft, having at least one aperture at the level of the gas headspace with the gas being aspirated at the level of the aperture in the hollow shaft.

33. The process according to claim 31, wherein the shaft is a solid shaft enveloped coaxially by a jacket which is advantageously cylindrical, a space being formed between the solid shaft and the jacket and communicating at its upper end with the gas headspace and opening at its lower end into the auto-aspirating impeller at the level of the pre-reaction zone, the gas being aspirated at the level of the gas headspace into the space formed between the shaft and the jacket.

34. The process according to claim 31, wherein the auto-aspirating impeller has at least two horizontal disks, an upper disk and a lower disk, connected together by ribs, with a space being formed between the upper disk and the shaft of the impeller, the space ensuring the input of the flow of liquid immediately adjacent to the end of the duct toward the pre-reaction zone situated at the base of the shaft between the disks of the impeller.

35. The process according to claim 29, wherein the shaft is a hollow shaft, having at least one aperture at the level of the gas headspace with the gas being aspirated at the level of the aperture in the hollow shaft.

36. The process according to claim 35, wherein the auto-aspirating impeller has at least two horizontal disks, an upper disk and a lower disk, connected together by ribs, with a space being formed between the upper disk and the shaft of the impeller, the space ensuring the input of the flow of liquid immediately adjacent to the end of the duct toward the pre-reaction zone situated at the base of the shaft between the disks of the impeller.

37. The process according to claim 29, wherein the shaft is a solid shaft enveloped coaxially by a jacket which is advantageously cylindrical, a space being formed between the solid shaft and the jacket and communicating at its upper end with the gas headspace and opening at its lower end into the auto-aspirating impeller at the level of the pre-reaction zone, the gas being aspirated at the level of the gas headspace into the space formed between the shaft and the jacket.

38. The process according to claim 37, wherein the auto-aspirating impeller has at least two horizontal disks, an upper disk and a lower disk, connected together by ribs, with a space being formed between the upper disk and the shaft of the impeller, the space ensuring the input of the flow of liquid immediately adjacent to the end of the duct toward the pre-reaction zone situated at the base of the shaft between the disks of the impeller.

39. The process according to claim 29, wherein the auto-aspirating impeller has at least two horizontal disks, an upper disk and a lower disk, connected together by ribs, with a space being formed between the upper disk and the shaft of the impeller, the space ensuring the input of the flow of liquid immediately adjacent to the end of the duct toward the pre-reaction zone situated at the base of the shaft between the disks of the impeller.

40. The process according to claim 1, wherein the reactor is equipped with anti-vortex counter-vanes on its internal walls.

41. The process according to claim 1, wherein during its implementation an at least partial withdrawal of the liberated calories is effected by means of cooling means disposed internally and/or externally of the reactor.

42. The process according to claim 1, wherein the liquid is heated.

43. The process according to claim 1, wherein the oxidation which is implemented is a catalytic oxidation.

44. The process according to claim 1, wherein the process is implemented with:
  a control of the temperature ($\theta$) and/or the pressure (P) in the gas headspace, and/or,
  a control of the liquid level within the said reactor, and/or,
  a control of the quantity of oxidant gas introduced, and/or,
  a control of the content of oxidant gas in the gas headspace, when at least one non-oxidant gas is contained in the oxidizing gas.

45. The process according to claim 1, wherein the process is implemented for the oxidation of an aqueous media containing sulfur compounds and/or metallic compounds with oxygen.

46. The process according to claim 45, wherein the process is implemented under the following conditions of temperature ($\theta$) and pressure (P):
  $20°\ C. \leq \theta \leq 200°\ C.$ and $10^5\ Pa \leq P \leq 10^7\ Pa$ (between 1 and 100 bars).

47. The process according to claim 45, wherein the process is implemented under the following conditions of temperature and pressure:
  $60°\ C. \leq \theta \leq 150°\ C.$ and $10^5\ Pa \leq P \leq 30.10^5\ Pa$ (between 1 and 30 bars).

48. The process according to claim 45, wherein the process is implemented under the following conditions of temperature and pressure:
  $100°\ C. \leq \theta \leq 130°\ C.$ and $10^5\ Pa \leq P \leq 15.10^5\ Pa$ (between 1 and 15 bars).

49. The process according to claim 1, wherein the process is implemented for the oxidation with oxygen of a liquid constituted by aqueous media containing organic compounds and having a chemical oxygen demand (COD) comprised between 5 and 200 g/l, and particularly for the oxidation of effluents which are difficultly biodegradable and/or which contain inhibitors of biological reactions.

50. The process according to claim 1, wherein the oxidizing gas contains at least 80% oxygen.

51. The process according to claim 1, wherein the oxidizing gas contains more than 98% oxygen.

52. The process according to claim 1, wherein the process is implemented for the partial or total oxidation of sulfides in papermaking liquors.

53. The process according to claim 1, wherein the process is implemented for the synthesis of polysulfides by oxidation of papermaking liquors.

54. The process according to claim 1, wherein the process is implemented for the oxidation of sulfides in industrial effluents.

55. The process according to claim 1, wherein the process is implemented for the oxidation of sulfites to sulfates.

56. The process according to claim 1, wherein the process is implemented for the oxidation of thiosulfates to sulfates.

57. The process according to claim 1, wherein the process is implemented for the oxidation of metallic compounds.

58. The process according to claim 57, wherein the metallic compounds comprise $FeSO_4$, $FeCl_2$ or $FeS$.

* * * * *